US011801929B2

(12) United States Patent
Blum et al.

(10) Patent No.: US 11,801,929 B2
(45) Date of Patent: Oct. 31, 2023

(54) ACTUATING SYSTEM FOR AN ACTUATABLE DOOR

(71) Applicant: AIRBUS HELICOPTERS DEUTSCHLAND GMBH, Donauworth (DE)

(72) Inventors: Stefan Blum, Buchdorf (DE); Christoph Merkel, Sontheim An der Brenz (DE); Marc Kirchner, Augsburg (DE); Thomas Tendyra, Schwenningen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 257 days.

(21) Appl. No.: 17/110,702

(22) Filed: Dec. 3, 2020

(65) Prior Publication Data

US 2021/0229792 A1    Jul. 29, 2021

(30) Foreign Application Priority Data

Jan. 28, 2020   (EP) ..................................... 20400003

(51) Int. Cl.
*E05B 79/12* (2014.01)
*E05C 19/00* (2006.01)
(Continued)

(52) U.S. Cl.
CPC ............ *B64C 1/1461* (2013.01); *E05B 79/12* (2013.01); *E05C 9/08* (2013.01); *E05C 9/1891* (2013.01);
(Continued)

(58) Field of Classification Search
CPC ............... E05B 79/12; Y10T 292/0853; Y10T 292/0828; Y10T 292/0829;
(Continued)

(56) References Cited

U.S. PATENT DOCUMENTS 2,748,855 A  *  6/1956  Siems ................... B64C 1/1415
                                                           160/180
3,647,169 A  *  3/1972  Allwright ............. B64C 1/1407
                                                           244/129.5
(Continued)

FOREIGN PATENT DOCUMENTS

DE           19825405 C2    8/2000
EP           0222160 B1     5/1987
(Continued)

OTHER PUBLICATIONS

European Search Report for European Application No. EP 20400003.8, Completed by the European Patent Office, dated Sep. 14, 2020, 7 pages.

*Primary Examiner* — Christine M Mills
*Assistant Examiner* — Faria F Ahmad
(74) *Attorney, Agent, or Firm* — Brooks Kushman P.C.

(57) ABSTRACT

An actuating system for an actuatable door and to an actuatable door having such an actuating system. The actuating system comprises first and second rotatable latching shafts, a coupling link, first and second pivotable mechanical transmission elements that are mounted onto first and second rotatable latching shafts, respectively, and first and second latching members. First and second latching members are non-rotatably mounted to the second rotatable latching shaft and adapted for latching the actuatable door in a closed position. A first rotation of the first rotatable latching shaft results in pivoting of the first and second mechanical transmission elements and a second rotation of the second rotatable latching shaft, which causes a third rotation of first and second latching members.

16 Claims, 9 Drawing Sheets

(51) Int. Cl.
*E05C 19/10* (2006.01)
*E05C 9/18* (2006.01)
*E05C 9/08* (2006.01)
*B64C 1/14* (2006.01)

(52) U.S. Cl.
CPC ............ *E05C 19/002* (2013.01); *E05C 19/10* (2013.01); *E05Y 2900/502* (2013.01); *Y10T 292/0828* (2015.04); *Y10T 292/0829* (2015.04); *Y10T 292/0853* (2015.04); *Y10T 292/0911* (2015.04); *Y10T 292/0945* (2015.04); *Y10T 292/0947* (2015.04); *Y10T 292/0952* (2015.04)

(58) Field of Classification Search
CPC ......... Y10T 292/0911; Y10T 292/0945; Y10T 292/0947; Y10T 292/0952; E05C 19/002; E05C 19/12; E05C 9/08; E05C 9/1891
See application file for complete search history.

(56) References Cited

U.S. PATENT DOCUMENTS

| | | | | |
|---|---|---|---|---|
| 4,125,235 A * | 11/1978 | Fitzgerald | ............... | B64C 1/143 244/905 |
| 4,470,566 A * | 9/1984 | Fitzgerald | ............... | B64C 1/143 292/201 |
| 4,473,201 A | 9/1984 | Barnes et al. | | |
| 4,758,030 A | 7/1988 | Kupfernagel | | |
| 4,961,601 A * | 10/1990 | Lindholm | ............... | E05B 83/16 292/216 |
| 5,031,863 A * | 7/1991 | Noble | ................... | B64C 1/1407 D12/345 |
| 5,305,969 A * | 4/1994 | Odell | .................... | B64C 1/1407 292/259 R |
| 10,662,897 B2 * | 5/2020 | Kopecek | ................. | E05C 19/12 |
| 2016/0201364 A1 * | 7/2016 | Starman | ............... | E05B 15/0086 292/108 |
| 2017/0089106 A1 | 3/2017 | Rabois | | |
| 2021/0262255 A1 * | 8/2021 | Blum | ...................... | E05B 83/00 |

FOREIGN PATENT DOCUMENTS

| | | |
|---|---|---|
| EP | 1270405 B1 | 5/2006 |
| EP | 3045387 A1 | 7/2016 |
| EP | 3168139 A1 | 5/2017 |
| EP | 2170698 B1 | 10/2017 |
| EP | 3147203 B1 | 2/2018 |
| GB | 2332705 A | 6/1999 |
| GB | 2361743 A | 10/2001 |
| WO | 2013172804 A1 | 11/2013 |
| WO | 2014091294 A1 | 6/2014 |

* cited by examiner

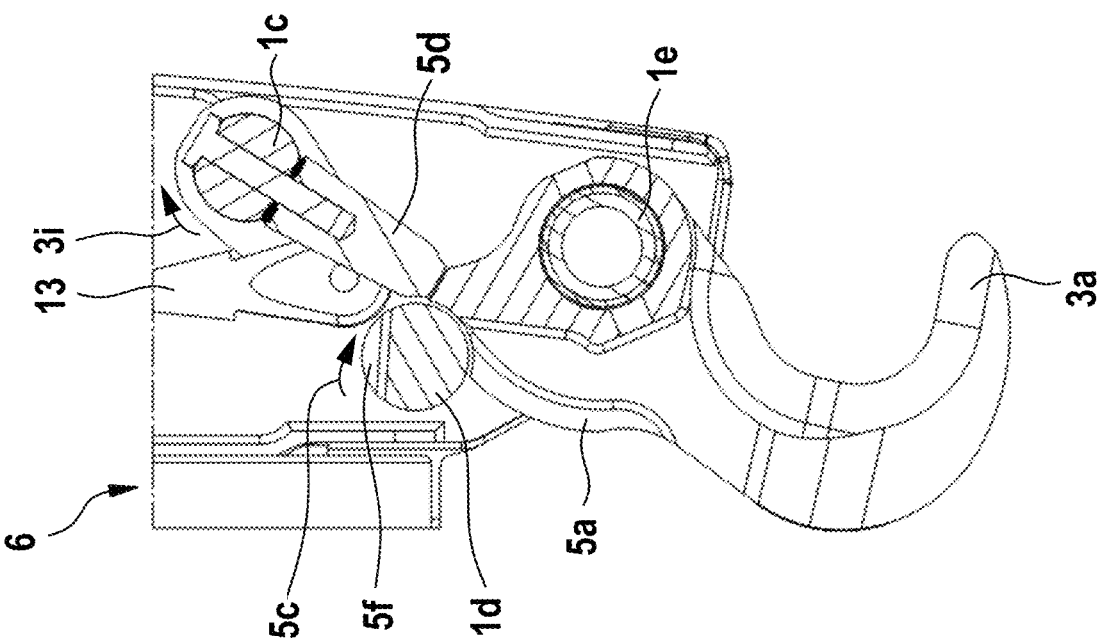
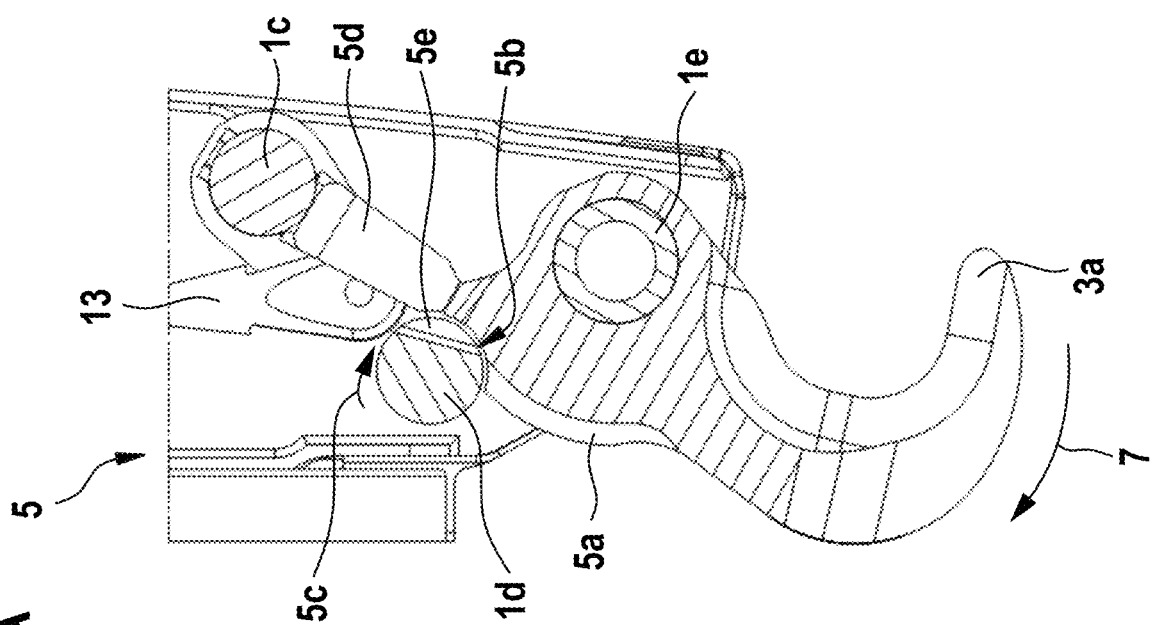

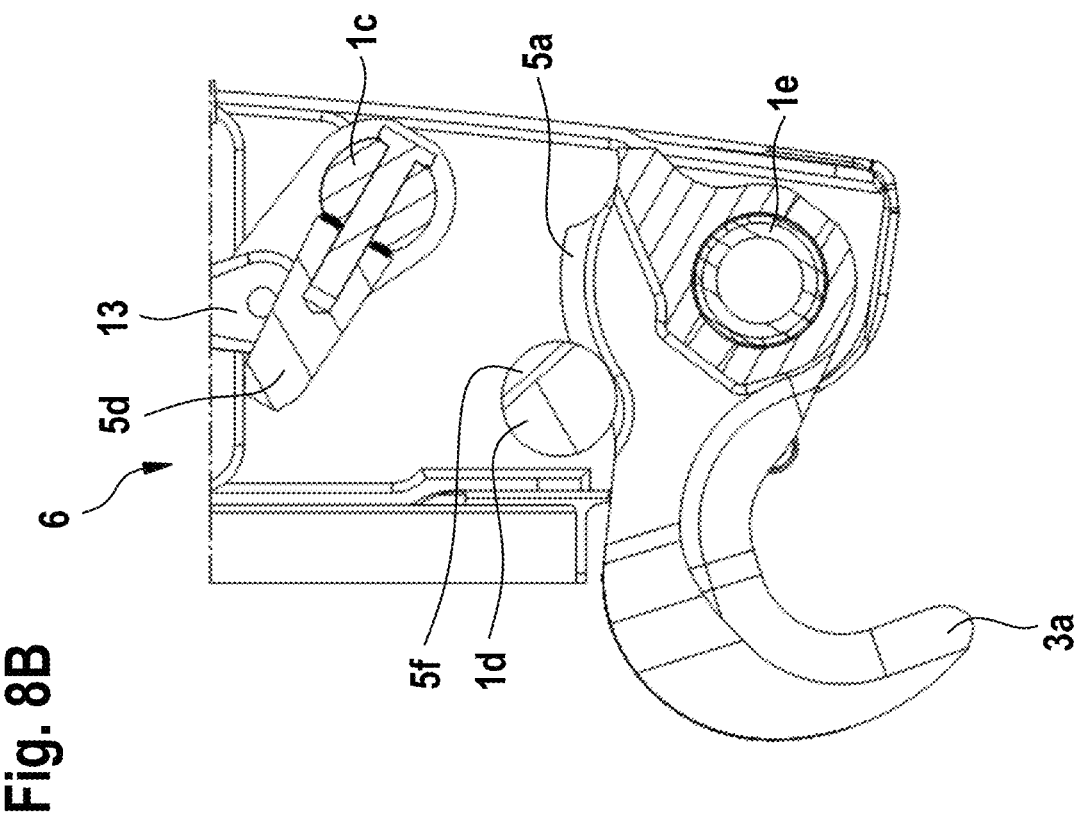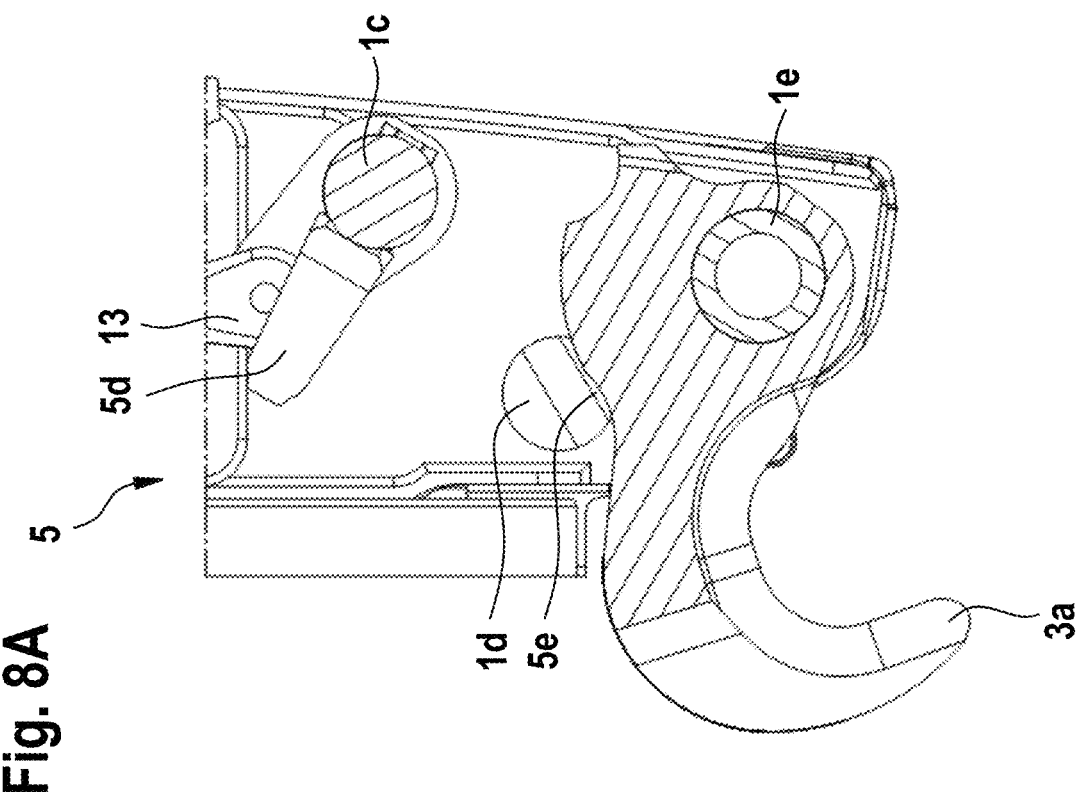

ACTUATING SYSTEM FOR AN ACTUATABLE DOOR

CROSS-REFERENCE TO RELATED APPLICATIONS

This application claims priority to European patent application No. EP 20400003.8 filed on Jan. 28, 2020, the disclosure of which is incorporated in its entirety by reference herein.

BACKGROUND OF THE INVENTION

(1) Field of the Invention

The present embodiments relate to an actuating system for an actuatable door, and, more particularly, to an actuating system for an actuatable door. The present embodiments further relate to an actuatable door, in particular for an aircraft, whereby the actuatable door comprises an actuating system.

(2) Description of Related Art

Actuatable doors and, in particular, actuatable cargo doors in aircrafts usually fulfill the following major functions: they close the aircrafts in operation for maintaining a required internal pressure therein, they contribute to carrying flight loads in corresponding lower deck cargo compartments, and they allow external access to the corresponding lower deck cargo compartments. Therefore, robust and safe actuating systems are required for reliably and safely closing the actuatable doors in operation, but also for fulfilling all relevant requirements defined by the competent authorities, such as e.g., in EASA CS 25.783 related to fuselage doors in general.

More specifically, according to EASA CS 25.783d (2) such actuating systems require latches and corresponding latching devices that must be designed so that, under all aircraft flight and ground loading conditions, there is no force or torque tending to unlatch the latches in closed state of the actuatable door. In addition, the latching devices must include means for securing the latches in an associated latched state. The securing of the latches and the latches must be independent from the lock if the latches are latched.

Furthermore, according to EASA CS 25.783d (5), locking members such as locking cams must be provided for locking the latches in the associated latched state. However, any positioning of the locking members in a locking position, wherein the locking members lock the latches, must be prevented as long as the latches and the corresponding latching devices are not in their associated latched state.

The document DE 198 25 405 C2 or GB2332705 describes a conventional actuating system for an actuatable door that fulfills these requirements and comprises a plurality of latching devices, each being provided with an associated latching hook that is adapted for latching the actuatable door in a closed position. Each latching hook is securable in its latched state by means of a separate rotatable securing device, which is implemented as a securing cam.

More specifically, each latching hook is pivotally mounted to a first pivot bearing and connected to a pivotable mechanical transmission element via a coupling link. The latter is implemented as a first coupling rod and on the one hand pivotally mounted to the latching hook by means of a second pivot bearing and on the other hand to the pivotable mechanical transmission element by means of a third pivot bearing. The pivotable mechanical transmission element is implemented as a bell crank, which is pivotable around an associated bell crank bolt defining a fourth pivot bearing. The bell crank is further coupled to a latch lever by means of a coupling link, which is implemented as a second coupling rod. The latter is on the one hand pivotally mounted to the bell crank by means of a fifth pivot bearing and on the other hand to the latch lever by means of a sixth pivot bearing. The latch lever is coupled to a rotatable latching shaft, which defines a seventh bearing of the conventional actuating system.

When operating the conventional actuating system according to the document DE 198 25 405 C2 or GB2332705 for locking the actuatable door in the closed position, the rotatable latching shaft is rotated in a predetermined rotational direction, thereby rotating the latch lever also into this predetermined rotational direction until the latch lever and the second coupling rod are in-line. The rotating latch lever entrains the second coupling rod, which in turn entrains the bell crank, thereby pivoting the latter into an opposed rotational direction. The pivoting bell crank thereby pushes the first coupling rod such that the latter rotates the latching hook also into this opposed rotational direction until the latching hook reaches a locking position, wherein the actuatable door is locked in the closed position. Subsequently, the locking cam is rotated in a securing position for securing and blocking the latching hook in its locked state.

For further securing and blocking the latching hook in its locked state such that the latching hook cannot be rotated accidentally or involuntarily from its locking position back into a releasing position, wherein the actuatable door can be opened, the first coupling rod is driven by the pivoting bell crank into a so-called "overcentered" position. This is done by rotating slightly beyond the dead center between bell crank and first coupling rod.

More specifically, the overcentered position is defined such that any rotation of the latching hook in the above described predetermined rotational direction for unlocking the latching hook due to an external force acting on the latching hook, would only lead to a further rotation of the bell crank into the above described opposed rotational direction, which is prevented by means of a mechanical stop. In other words, when the first coupling rod is in the overcentered position, the latching hook can only be driven from its locking position into its releasing position by rotating the latch lever into the above described opposed rotational direction by means of the rotatable latching shaft.

However, the above described conventional actuating system is comparatively complicated and expensive, as each latching device thereof, i.e., without the separate rotatable locking device, comprises multiple constituent components including five moving parts in row with seven bearings involved. Consequently, this conventional actuating system is comparatively heavy and space consuming and manufacturing and assembly thereof is rather complicated due to the great number of components and tolerances.

Exemplary other mechanisms for closing aircraft doors are described in documents EP 3 045 387 A1, EP 3 147 203 B1, WO 2014/091294 A1, EP 2 170 698 B1, EP 1 270 405 B1, and EP 0 222 160 B1.

For example, document EP 3 045 387 A1 describes an actuating system for locking an actuatable door in a closed position. The actuating systems comprises at least one latching device with a latching hook. The latching hook is pivotally mounted to an associated pivot bearing and connected to a pivotable mechanical transmission element via a coupling link. In operation of the latching device and, more particularly for pivoting the latching hook from a corresponding releasing position into its locking position, during a respective latching procedure, a rotatable latching shaft is rotated by means of the latching device in a latching rotation direction, thereby pushing the coupling link towards the latching hook, which is, thus pivoted around the associated pivot bearing in the latching rotation direction until it is locked at a counter peg.

In order to guarantee that the latching hook is prevented from an uncontrolled unlatching by a back-driving force acting thereon, the coupling link and the pivotable mechanical transmission element are overcentered. An overcentering adjustment device is provided for pivoting the pivotable mechanical transmission element in operation at least from an in-line position into an overcentered position.

However, in the above described document each latching hook is installed on a separate pivot bearing, which serves as a rotation axis for the latching hook. Each latching hook is driven by the latching shaft via its own drive mechanism. In other words, all the latching hooks are driven individually by the latching shaft via their latching hook drives. In addition, each latching hook drive serves as latch securing means for its latching hook.

It is, therefore, an objective to provide a new actuating system for an actuatable door that has a very compact design and comprises less constituent components, is easier to produce and assemble, and comparatively inexpensive to manufacture compared to state-of-the-art actuating systems. Furthermore, it is an objective to provide a new actuatable door comprising such a new actuating system.

The document U.S. Pat. No. 4,473,201 describes a commercial passenger aircraft having a fuselage where is mounted an aircraft door. The aircraft door is for loading cargo aboard the commercial passenger aircraft, and is operated from the outside of fuselage via a handle assembly. For fail-safe operation in the case of distortions in the fuselage due to fully load cargo storage, mechanical latch locking segments are precluded from unduly moving into latch locking position, thereby precluding pivotal movement of a master control lever. In that purpose, hinge actuating mechanisms include a drive unit and a linkage assembly secured to the fuselage with a series of actuating components mounted on the door. One actuating mechanisms forming a latch cam assembly employs a single actuator for pulling door to a fully closed position and for latching/unlatching a plurality of bottom latches.

The document EP3168139 describes a door assembly, for doors of passenger aircraft having a door body hinged and installed in a door frame, and door latches. Each door latch has a latch fulcrum and a latch lever and is configured to pivot around a pivot axis around the latch fulcrum. Each door latch has a hook member to allow pivoting movement of the door latch. A bi-stable latch linkage is also hinged and connected one latch lever.

The document WO2013172804 describes a door latch mechanism for safe opening and closing of aircraft doors, having an additional capability of being used under emergencies.

Another document was cited, i.e., GB2361743.

BRIEF SUMMARY OF THE INVENTION

The above objectives are solved by an actuating system and an actuatable door as exposed.

More specifically, an actuating system for an actuatable door may comprise a first rotatable latching shaft, a second rotatable latching shaft, a coupling link, a first pivotable mechanical transmission element, a second pivotable mechanical transmission element, and first and second latching members. The first pivotable mechanical transmission element is mounted onto the first rotatable latching shaft. The second pivotable mechanical transmission element is mounted onto the second rotatable latching shaft, and is connected to the first pivotable mechanical transmission element via the coupling link. The coupling link is pivotally mounted to the first pivotable mechanical transmission element and to the second pivotable mechanical transmission element, such that a first rotation of the first rotatable latching shaft in operation upon actuation results in pivoting of the first pivotable mechanical transmission element, pivoting of the second mechanical transmission element, and a second rotation of the second rotatable latching shaft. The first and second latching members are non-rotatably mounted to the second rotatable latching shaft and adapted for latching the actuatable door in a closed position. The second rotation of the second rotatable latching shaft causes a third rotation of the first and second latching members around an axis defined by the second rotatable latching shaft.

Advantageously, the actuating system comprises a reduced number of constituent components and a simplification of these constituent components compared to the above described conventional actuating systems of aircraft doors, while still fulfilling all relevant requirements defined by the competent authorities, such as e.g., in EASA CS 25.783.

Advantageously, the actuating system comprises a centralized latch drive, which drives the first rotatable latching shaft that ultimately causes a rotation of all latching members that are mounted to the second rotatable latching shaft. Thus, all latches are driven by the minimum required number of latch drives.

The latch securing is part of the operating mechanism of the latch, but it is independent of the direct latch drive. Therefore, it is a very compact design that provides for a double monitoring of latch securing and lock. In fact, the latch securing monitors that the latch is in a latched position before the latch securing reaches its secured position and therefore secures the latch. The lock is locking the latch and monitors the latched position of the latches and monitors the secured position of the latch securing.

All latching members may be mounted to the second rotatable latching shaft. If desired, one of the latching members may be connected via the coupling link with the first rotatable latching shaft. Thus, a rotation of the first rotatable latching shaft may cause a rotation of the one of the latching members, and this rotation is directly transferred to all other latching members. As a result, the forces from the latching member bypass the first rotatable latching shaft.

The first rotatable latching shaft may be located close to the second rotatable latching shaft to secure the latching member directly.

At least one latching member may be slotted and mounted on two sides of an I-profile frame. The latch securing may be applied on both sides of the I-profile frame. However, the latch securing could be reduced in total number and implemented on only one side of the I-profile frame, if desired.

The actuating system may include a rotatable locking shaft. The rotatable locking shaft may monitor and secure the latching member position as well as the latch securing position. The rotatable locking shaft may have a recess to allow a latching member rotation when the latching member is unlocked. The rotatable locking shaft may have an additional recess to allow the latch securing to pass when the actuatable system is in an unlocked mode.

At least one of the latching members may include a cam that blocks the lock shaft when the actuatable system is in an unlatched mode.

If desired, an associated handle part for manually actuating the actuating system according to the present invention can be implemented up to a handle shaft by means of a conventional handle part that is, e.g., described in the document DE 198 25 405 C2.

According to one aspect, the first pivotable mechanical transmission element and the second pivotable mechanical transmission element comprise at least one bell crank.

According to one aspect, the coupling link comprises at least one coupling rod.

According to one aspect, the actuating system further comprises at least one pin that prevents a rotation of the first latching member relative to the second rotatable latching shaft.

According to one aspect, the second pivotable mechanical transmission element comprises a first end and a second end. The first end of the second pivotable mechanical transmission element is mounted non-rotatively to the second rotatable latching shaft such that a rotation of the second end of the second pivotable mechanical transmission element around the axis defined by the second rotatable latching shaft causes a rotation of the second rotatable latching shaft.

According to one aspect, the first pivotable mechanical transmission element comprises a first end and a second end. The first end of the first pivotable mechanical transmission element is mounted non-rotatively to the first rotatable latching shaft such that a rotation of the first rotatable latching shaft causes a rotation of the second end of the first pivotable mechanical transmission element around an additional axis defined by the first rotatable latching shaft.

According to one aspect the actuating system further comprises first and second latch securing devices that prevent the third rotation of the first and second latching members when the first and second latching members latch the actuatable door in the closed position.

According to one aspect, the first and second latch securing devices are fixedly mounted to the first rotatable latching shaft, and wherein the first rotation of the first rotatable latching shaft causes a fourth rotation of the first and second latch securing devices around an additional axis defined by the first rotatable latching shaft.

According to one aspect, the actuating system further comprises a rotatable locking shaft that is adapted for blocking the first and second latching members when the first and second latching members latch the actuatable door in the closed position.

According to one aspect, the rotatable locking shaft is further adapted for blocking the first and second latch securing devices when the first and second latching members latch the actuatable door in the closed position.

In other words, the rotatable locking shaft guarantees that the latching member is prevented from an uncontrolled, i.e., unintended and/or accidental unlatching by a back-driving force acting thereon. The locking shaft is an additional safety device that prevents the latching member from an uncontrolled unlatching.

According to one aspect, the actuating system further comprises a third pivotable mechanical transmission element that is mounted to the rotatable locking shaft and wherein a rotational movement of the third pivotable mechanical transmission element causes a rotation of the rotatable locking shaft.

According to one aspect, the rotatable locking shaft further comprises at least one recess that is adapted for unblocking the first latch securing device and enables a movement of the first latch securing device past the rotatable locking shaft.

According to one aspect, the rotatable locking shaft further comprises at least one additional recess that is adapted for unblocking the first latching member and enables the third rotation of the first latching member past the rotatable locking shaft during an unlatching operation.

According to one aspect, the first latching member further comprises a locking cam that blocks the rotatable locking shaft when the first latching member is unlatched.

Moreover, an actuatable door in particular for an aircraft, may comprise an actuating system with at least a first rotatable latching shaft, a second rotatable latching shaft, a coupling link, a first pivotable mechanical transmission element, a second pivotable mechanical transmission element, and first and second latching members. The first pivotable mechanical transmission element is mounted onto the first rotatable latching shaft. The second pivotable mechanical transmission element is mounted onto the second rotatable latching shaft and is connected to the first pivotable mechanical transmission element via the coupling link. The coupling link is pivotally mounted to the first pivotable mechanical transmission element and to the second pivotable mechanical transmission element, such that a first rotation of the first rotatable latching shaft in operation upon actuation results in pivoting of the first pivotable mechanical transmission element, pivoting of the second mechanical transmission element, and a second rotation of the second rotatable latching shaft. First and second latching members are non-rotatably mounted to the second rotatable latching shaft and adapted for latching the actuatable door in a closed position. The second rotation of the second rotatable latching shaft causes a third rotation of the first and second latching members around an axis defined by the second rotatable latching shaft.

BRIEF DESCRIPTION OF THE DRAWINGS

Preferred embodiments are outlined by way of example in the following description with reference to the attached drawings. In these attached drawings, identical or identically functioning components and elements are labeled with identical reference numbers and characters and are, consequently, only described once in the following description.

FIG. 5A shows the illustrative locking device of FIG. 4A in an intermediate position between fully locked and unlocked in accordance with some embodiments, FIG. 5B shows the illustrative latch securing monitoring device of FIG. 4B still in the fully latched position in accordance with some embodiments, FIG. 8A shows the illustrative locking device of FIGS. 4A, 5A, 6A, and 7A in a further unlocked position in accordance with some embodiments, FIG. 8B shows the illustrative latch securing monitoring device of FIGS. 4B, 5B, 6B, and 7B in an unlatched position in accordance with some embodiments.

DETAILED DESCRIPTION OF THE INVENTION

Figure 1:
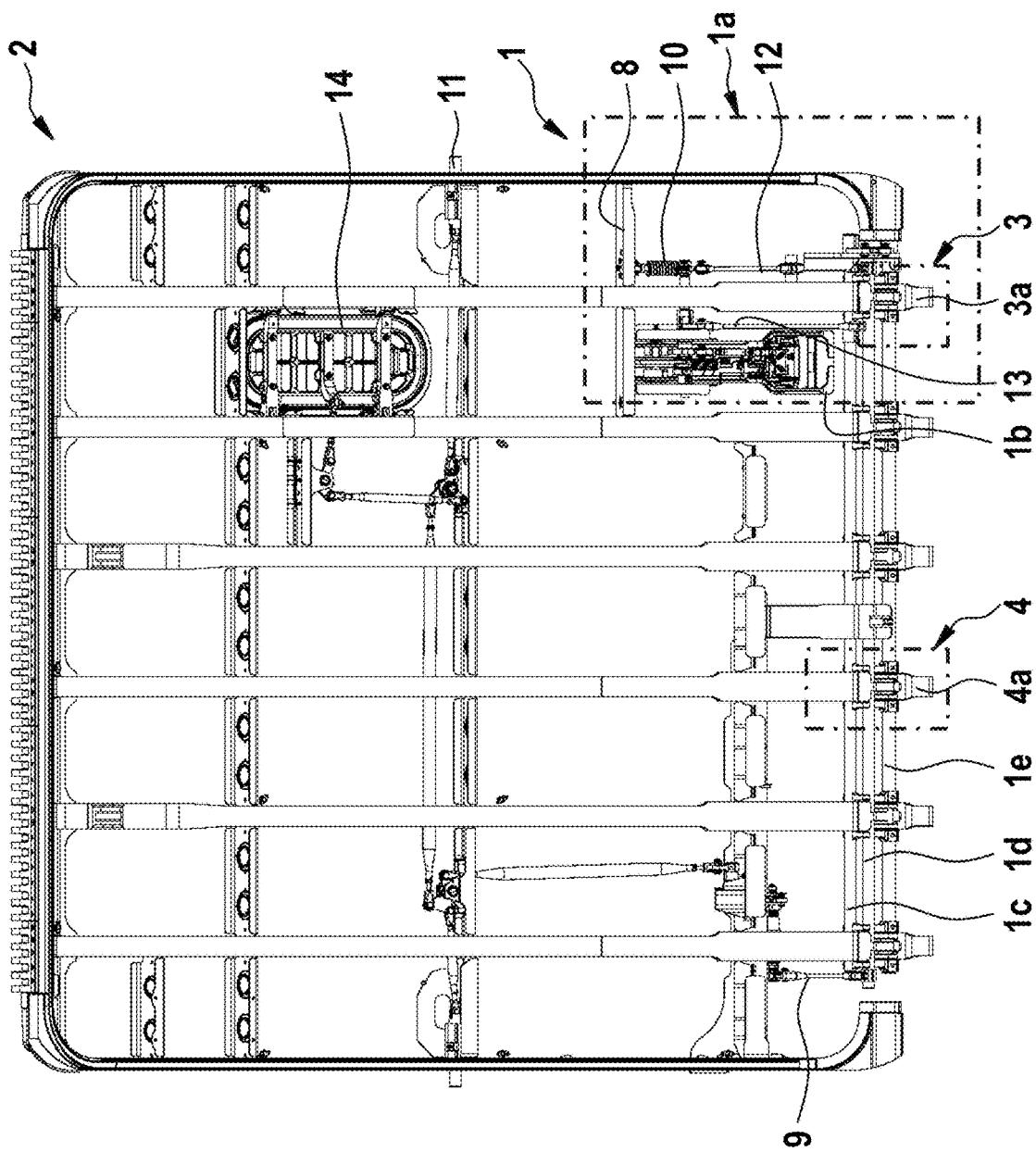
FIG. 1 shows a schematic view of an illustrative actuatable door with an illustrative actuating system having an actuating device and first and second latching devices in accordance with some embodiments.

FIG. 1 shows an actuating system 1 for an actuatable door 2 in accordance with some embodiments. In other words, FIG. 1 shows an actuatable door 2 comprising actuating system 1. The actuating system 1 is adapted for reliably and securely locking the actuatable door 2 in a closed position, such that the actuatable door 2 preferentially fulfils all relevant requirements defined by the competent authorities, such as e.g., in EASA CS 25.783.

The actuatable door 2 may be adapted to close an associated door mounting structure, such as a fuselage of an aircraft, preferentially in a fluid-tight manner. According to one aspect, the actuatable door 2 is a cargo door of an aircraft. However, it should be noted that the use of actuatable door 2 is not restricted to cargo doors of aircrafts. Instead, actuatable door 2 may be used for any actuatable doors, including actuatable doors in vessels, such as ships and so on. Such actuatable doors may be equipped with the inventive actuating system 1.

By way of example, the actuatable door 2 comprises at least one, preferably two, lateral latch bolts 11. Lateral latch bolts 11 may extend from the lateral exterior side of the actuatable door 2 towards the door mounting structure.

Illustratively, the actuating system 1 comprises an actuating device 1a with an operating handle 1b. Actuating device 1a may be adapted for actuating respectively rotating a first rotatable latching shaft 1c. If desired, the actuating device 1a may be adapted for rotating a rotatable locking shaft 1d in operation.

For example, the first rotatable latching shaft 1c may be connected to the operating handle 1b by means of at least one latching shaft linkage 13. Illustratively, the first rotatable latching shaft 1c may be linked to a second rotatable latching shaft 1e.

The rotatable locking shaft 1d may be connected to the operating handle 1b by means of at least one locking shaft linkage 12. Illustratively, the at least one locking shaft linkage 12 may be mounted to a pressure spring 10. The pressure spring 10 may be mounted to a door structure 8.

Actuating system 1 may include a first latching device 3, which is described in more detail below with reference to FIG. 3. Illustratively, actuating system 1 comprises a second latching device 4.

If desired, the respective latching and unlatching mechanisms of the first latching device 3 and the second latching device 4 may be similar. It should be noted that the actuating system 1 illustratively comprises six such latching devices 3, 4, but for simplicity and clarity of the drawings, only a single latching device is labeled with the reference sign 3, and only one single latching device is labeled with the reference sign 4. An illustrative latching device is described below with reference to FIG. 3 representative for all six latching devices.

By way of example, the first latching device 3 comprises a first latching member 3a, which is non-rotatably mounted to the second rotatable latching shaft 1e. First latching member 3a may be latchable at an associated counter element provided at a door frame, non-represented for simplicity and clarity. Likewise, the second latching device 4 comprises a second latching member 4a, which is non-rotatably mounted to the second rotatable latching shaft 1e.

Illustratively, first and second latching members 3a, 4a may be implemented as hooks, as C-latches, as toggle latches, or as any other latching members that may be latchable at associated devices (e.g., counter pegs, cylinders, or shafts) provided at a door frame. If desired, first and second latching members 3a, 4a may be implemented as cylinders or shafts and the associated devices provided at a door frame may be implemented as hooks or C-latches.

First and second latching members 3a, 4a are both non-rotatably mounted to the second rotatable latching shaft 1e. Thus, for the remainder of this description it is assumed that the first latching member 3a is latching the actuatable door 2 in the closed position when the second latching member 4a is latching the actuatable door 3 in the closed position and vice versa. Similarly, the first latching member 3a is unlatching the actuatable door 2 when the second latching member 4a is unlatching the actuatable door 3 and vice versa.

The rotatable locking shaft 1d is adapted for blocking the first and second latching members 3a, 4a when the first and second latching members 3a, 4a latch the actuatable door 2 in the closed position.

Illustratively, the actuatable door 2 may include vent door 14 which is well-known to the person skilled in the art, and which is preferably actuated by means of a linkage 9. If desired, linkage 9 may be connected to lateral latch bolts 11.

Figure 2:
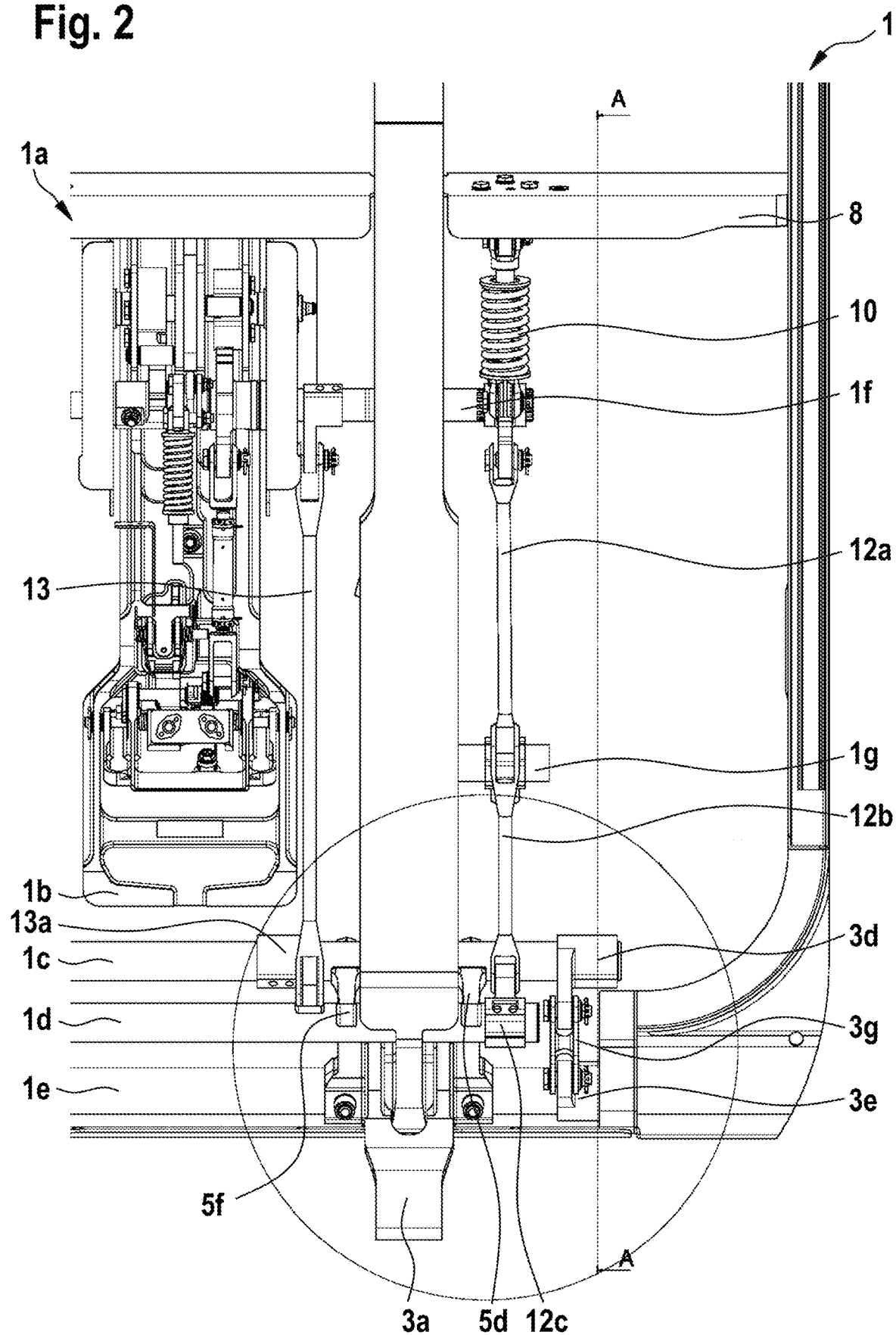
FIG. 2 shows an enlarged view of the illustrative actuatable door of FIG. 1 with a focus on a portion of the illustrative actuating system in accordance with some embodiments.

FIG. 2 shows an enlarged view of the actuatable door 2 of FIG. 1, with a focus on a portion of the actuating system 1 with actuating device 1a. With reference to FIG. 1, the operating handle 1b actuates a rotatable shaft 1f, which is driven indirectly via a maltese cross by a handle shaft. This rotatable shaft 1f is connected to a latching shaft linkage 13 and to a locking shaft linkage (e.g., locking shaft linkage 12 of FIG. 1), which are driven in sequence one after the other by means of a maltese cross drive.

At one end, latching shaft linkage 13 may be connected to rotatable shaft 1f. At the other end, latching shaft linkage 13 may be connected to a latching shaft transmission element 13a.

Upon actuation of the operating handle 1b, the rotatable shaft 1f rotates and drives the latching shaft linkage 13, which causes swiveling of the latching shaft transmission element 13a. The swiveling of the latching shaft transmission element 13a causes a first rotation of the first rotatable latching shaft 1c.

Illustratively, a first pivotable mechanical transmission element 3d is mounted onto the first rotatable latching shaft 1c. If desired, the first pivotable mechanical transmission element 3d is fixedly mounted at the extremity of the first rotatable latching shaft 1c.

A coupling link 3g may be pivotally mounted to the first pivotable transmission element 3d. Coupling link 3g may connect the first pivotable transmission element 3d to a second pivotable mechanical transmission element 3e. The connection between first and second pivotable transmission elements 3d, 3e is described in more detailed below with reference to FIG. 3.

The second pivotable mechanical transmission element 3e is mounted onto the second rotatable latching shaft 1e. If desired, the second pivotable mechanical transmission element 3e is fixedly mounted at the extremity of the second rotatable latching shaft 1e.

A first rotation of the first rotatable latching shaft 1c in operation upon actuation may result in pivoting of the first pivotable mechanical transmission element 3d, pivoting of the second mechanical transmission element 3e, and a second rotation of the second rotatable latching shaft 1e.

The rotatable shaft 1f further actuates the locking shaft linkage (e.g., locking shaft linkage 12 of FIG. 1). The locking shaft linkage may include a first part 12a that is connected to a second part 12b via an intermediate shaft 1g. The second part 12b may be connected to a third pivotable mechanical transmission element 12c.

The third pivotable mechanical transmission element 12c may be mounted to the rotatable locking shaft 1d. If desired, the third pivotable mechanical transmission element 12c is fixedly mounted at the extremity of the rotatable locking shaft 1d.

By way of example, actuating system 1 may include at least one latching member such as latching member 3a. If desired, latching member 3a may be slotted and mounted on two sides of an I-profile frame.

Illustratively, the actuating system 1 may include at least one latch securing device 5d that is associated with latching member 3a. If desired, the actuating system 1 may include a pair of latch securing devices 5d that is associated with latching member 3a. For example, one latch securing device 5d of the pair of latch securing devices 5d may be located on each side of the I-profile frame and/or latching member 3a.

By way of example, latch securing device 5d may prevent a third rotation of latching member 3a, when latching member 3a latches the actuatable door in the closed position. If desired, rotatable locking shaft d may be adapted for blocking the at least one latch securing device 5d when the latching member 3a latches the actuatable door (e.g., actuatable door 2 of FIG. 1) in the closed position.

Rotatable locking shaft 1d may include at least one recess 5f that is adapted for unblocking the at least one latch securing device 5d. In the scenario in which the actuating system 1 includes a pair of latch securing devices 5d that is associated with latching member 3a, rotatable locking shaft 1d may comprise a pair of recesses 5f, whereby each recess 5f of the pair of recesses 5f is adapted for unblocking a latch securing device 5d of the pair of latch securing devices 5d. The at least one recess 5f may enable a movement of latch securing device 5d past the rotatable locking shaft 1d.

If desired, the rotatable locking shaft 1d may include at least one additional latch securing device 5d, that prevents the rotation of an additional latching member (e.g., latching member 4a of FIG. 1) when the additional latching member latches the actuatable door (e.g., actuatable door 2 of FIG. 1) in a closed position.

Illustratively, the at least one latch securing device 5d and the at least one additional latch securing device 5d are fixedly mounted to the first rotatable latching shaft 1c. The first rotation of the first rotatable latching shaft 1c causes a fourth rotation of the at least one latch securing device 5d and the at least one additional latch securing device 5d around an axis defined by the first rotatable latching shaft 1c.

Figure 3:
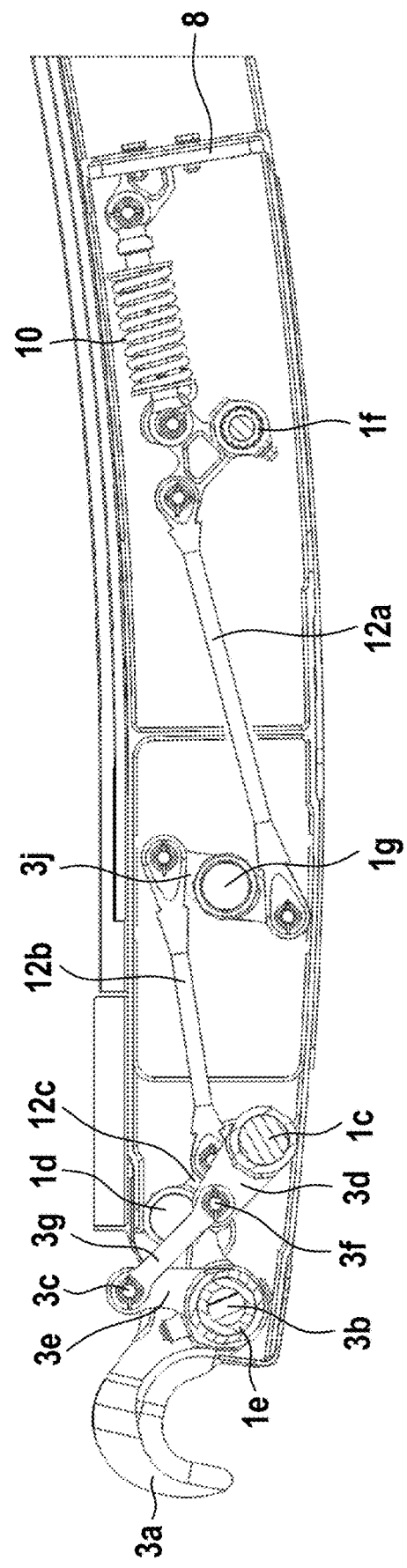
FIG. 3 shows a side view of a section A-A of the illustrative portion of actuating system of FIG. 2 with a latching device and a locking device in accordance with some embodiments.

FIG. 3 shows the illustrative portion of actuating system 1 of FIG. 2, according to the line A-A of FIG. 2. As exemplarily shown, the actuating system may be in a locking position.

Illustratively, the actuating system may be mounted to an actuatable door (e.g., actuatable door 2 of FIG. 1). The actuating system may be adapted for locking the actuatable door in a closed position in an associated door frame, which is e.g., defined by a fuselage of an aircraft as described above and, if desired, associated with a cargo thereof.

By way of example, latching member 3a may be non-rotatably mounted to the second rotatable latching shaft 1e by means of at least one pin 3b. The at least one pin 3b may prevent a rotation of latching member 3a relative to the second rotatable latching shaft 1e.

If desired, latching member 3a may be slotted and mounted on two sides of an I-profile frame. For example, latching member 3a may be mounted to the second rotatable latching shaft 1e by means of two pins 3b, one on each side of the I-profile frame.

The first pivotable mechanical transmission element 3d may have a first end and a second end. The first end of the first pivotable mechanical transmission element 3d may be mounted non-rotatively to the first rotatable latching shaft 1c such that a rotation of the first rotatable latching shaft 1c causes a rotation of the second end of the first pivotable mechanical transmission element 3d around an additional axis defined by the first rotatable latching shaft 1c. The second end of the first pivotable mechanical transmission element 3d may be pivotally mounted to a first end of the coupling link 3g. The coupling link 3g may include at least one coupling rod.

The second pivotable mechanical transmission element 3e comprises a first end and a second end. The first end of the second pivotable mechanical transmission element 3e is mounted non-rotatively to the second rotatable latching shaft 1e such that a rotation of the second end of the second pivotable mechanical transmission element 3e around the axis defined by the second rotatable latching shaft 1e causes a rotation of the second rotatable latching shaft 1e. The second end of the second pivotable mechanical transmission element 3e may be pivotally mounted to a second end of the coupling link 3g.

Illustratively, the first end of the coupling link 3g is pivotally mounted to the second end of the first pivotable mechanical transmission element 3d by means of a connecting element 3f. If desired, connecting element 3f may include a connecting bolt, which defines a plain bearing between the first pivotable mechanical transmission element 3d and the coupling link 3g.

By way of example, the second end of the coupling link 3g is pivotally mounted to the second end of the second pivotable mechanical transmission element 3e by means of a connecting element 3c. If desired, connecting element 3c may include a connecting bolt, which defines a plain bearing between the coupling link 3g and the second pivotable mechanical transmission element 3e.

The first pivotable mechanical transmission element 3d may include at least one bell crank 3d. Illustratively, the second pivotable mechanical transmission element 3e may include at least one bell crank 3e.

The actuation of an operating handle (e.g., operating handle 1b of FIG. 1) may lead to a rotation of the first rotatable latching shaft 1c. A rotation of the first rotatable latching shaft 1c in operation upon actuation may result in pivoting of the first pivotable mechanical transmission element 3d. Pivoting the first pivotable mechanical transmission element 3d may push the coupling link 3g towards the first latching member 3a, such that the coupling link 3g pivots the second mechanical transmission element 3e. Pivoting the second mechanical transmission element 3e may cause a rotation of the second rotatable latching shaft 1e.

If desired, with reference to FIG. 2, the rotatable locking shaft 1d is rotated by means of an operating handle (e.g., operating handle 1b of FIG. 2) until the rotatable locking shaft 1d reaches a predetermined blocking position. In this blocking position which is exemplarily illustrated in FIG. 4A, the rotatable locking shaft 1d prevents a rotation of latching member 3a and a rotation of a latch securing device (e.g., latch securing device 5d of FIG. 2) in an unlatching rotation direction (e.g., unlatching rotation direction 3i of FIG. 4B) opposed to the latching rotation direction, so that prevention of an inadvertent and/or accidental releasing of the latching device (e.g., latching device 3 of FIG. 1) is further secured and supported.

Illustratively, pressure spring 10 may be mounted between door structure 8 and a first part of locking shaft linkage 12a. The first part of locking shaft linkage 12a may be actuated by the rotatable shaft 1f. Rotation of the rotatable shaft 1f may push the first part of the linkage 12a away from pressure spring 10, thereby causing a rotation of cross link 3j around intermediate shaft 1g.

Rotation of the cross link 3j pulls the second part of the locking shaft linkage 12b towards pressure spring 10, which in turn drives third pivotable mechanical transmission element 12c. Third pivotable mechanical transmission element 12c may be mounted to rotatable locking shaft 1d, and a translational movement of the third pivotable mechanical transmission element 12c causes a rotation of the rotatable locking shaft 1d.

Illustratively, FIGS. 4A to 8B show latching device 3 of FIG. 3 at different phases of an unlatching operation 7. An unlatching operation similar to unlatching operation 7 may unlatch latching member 4a of FIG. 1. If desired, the same unlatching operation as unlatching operation 7 may unlatch latching member 4a of FIG. 1.

Figure 4B:
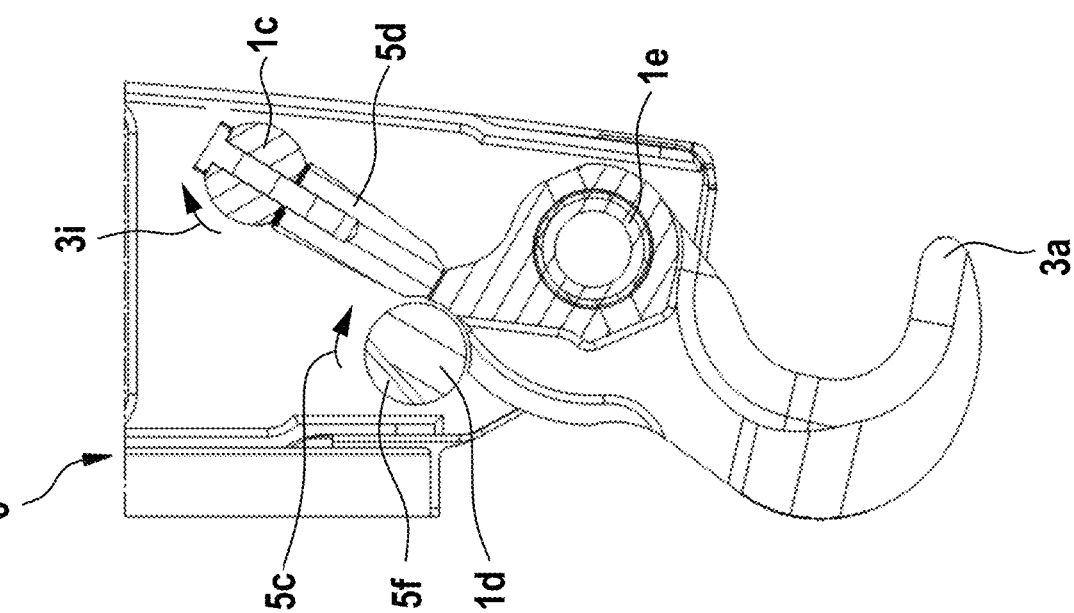
FIG. 4B shows an illustrative latch securing monitoring device in a fully latched position in accordance with some embodiments.
Figure 4A:
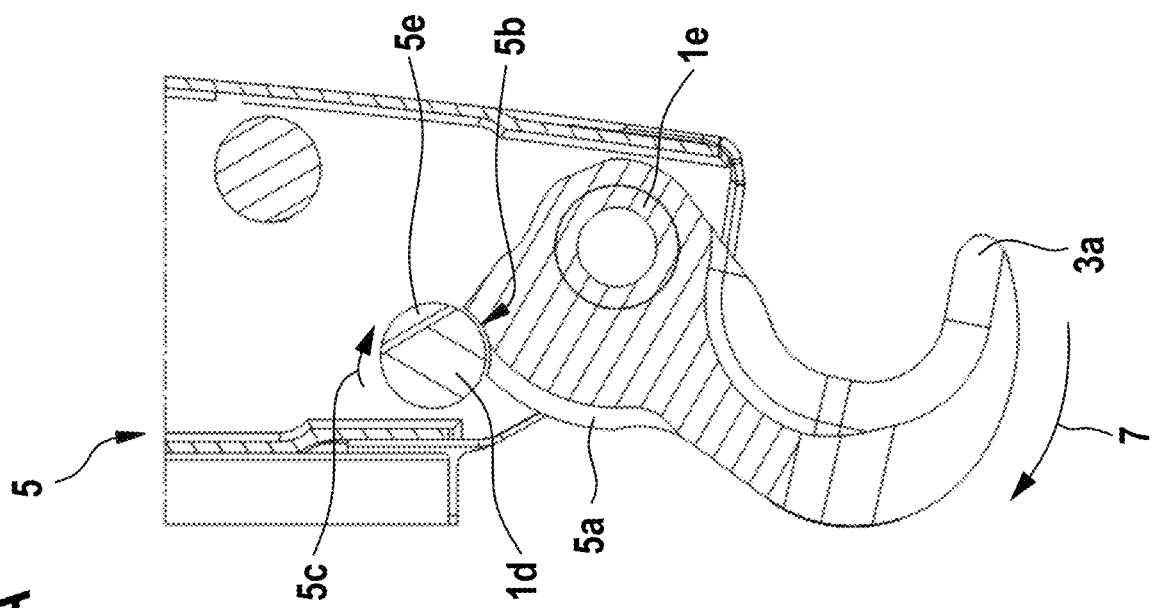
FIG. 4A shows an illustrative locking device in a fully locked position in accordance with some embodiments.

As exemplarily shown in FIG. 4A, at least one locking device 5 is provided. Locking device 5 may be adapted for securing latching member 3a in its closed position.

Locking device 5 illustratively comprises rotatable locking shaft 1d. Rotatable locking shaft 1d may be adapted for blocking latching member 3a when latching member 3a latches an actuatable door (e.g., actuatable door 2 of FIG. 1) in the closed position. For example, rotatable locking shaft 1d may prevent a rotation of latching member 3a when latching member 3a latches the actuatable door in the closed position.

Locking shaft 1d may exhibit recess 5e. For example, recess 5e may be adapted for unblocking latching member 3a and enables a rotation of latching member 3a past the rotatable locking shaft 1d during unlatching operation 7.

Illustratively, latching member 3a may include a locking cam 5a. As an example, locking cam 5a may block the rotatable locking shaft 1d when latching member 3a is unlatched. Latching member 3a is said to be unlatched, when latching member 3a no longer prevents the actuatable door from being opened. If desired, locking cam 5a may engage with recess 5e to prevent a rotation of rotatable locking shaft 1d when latching member 3a is unlatched. As another example, locking cam 5a together with rotatable locking shaft 1d may prevent a rotation of latching member 3a when latching member 3a latches the actuatable door in the closed position.

Latching member 3a may have a circular shape 5b. For example, the end of locking cam 5a may evolve into circular shape 5b. Circular shape 5b of latching member 3a may engage with the rotatable locking shaft 1d in the fully locked position.

Unlatching operation 7 for unlatching latching member 3a may start with an opening movement of the operating handle (e.g., operating handle 1b of FIG. 1). The opening movement of the operating handle may lead to a rotation of rotatable locking shaft 1d in an unlocking rotation direction 5c. For example, an actuating device (e.g., actuating device 1a of FIG. 1) may rotate rotatable locking shaft 1d as described with reference to FIGS. 1 to 3.

As exemplarily shown in FIG. 4B, the latch securing monitoring device 6 comprises latch securing device 5d. Latch securing device 5d may be fixedly mounted to the first rotatable latching shaft 1c. Latch securing device 5d may rotate together with the first rotatable latching shaft 1c. In other words, a rotation of the first rotatable latching shaft 1c may cause a rotation of latch securing device 5d around an axis defined by the first rotatable latching shaft 1c.

Locking shaft 1d may exhibit an additional recess 5f. Recess 5f and recess 5e of FIG. 4A may be independent of each other. For example, recess 5f may be adapted for unblocking the latch securing device 5d and enables a movement of the latch securing device 5d past the rotatable locking shaft 1d.

In operation the rotatable locking shaft 1d is rotated, by means of the actuating device 1a of FIGS. 1 and 2, in unlocking rotation direction 5c. Rotation of the rotatable locking shaft 1d rotates recess 5f.

Subsequently, the latch securing device 5d which is entrained by the first rotatable latching shaft 1c rotates through recess 5f until the latch securing device 5d reaches an unlatched position. Likewise, rotation of the rotatable locking shaft 1d rotates recess 5e. Subsequently, the first latching member 3a rotates through recess 5e past the rotatable locking shaft 1d.

In operation of latching device 3 and, more particularly for pivoting latching member 3a from a latching position into a corresponding unlatched position during an unlatching operation, the second rotatable latching shaft 1e is rotated by means of the actuating device 1a of FIGS. 1 and 2 in an unlatching rotation direction 3i.

More particularly, FIG. 4A shows the locking device 5 in a fully locked position. In the fully locked position, an inadvertent and/or accidental release of latching member 3a is securely and reliably prevented. In fact, rotatable locking shaft 1d prevents the unlatching operation 7 of latching member 3a.

FIG. 4B shows the latch securing monitoring device 6 in a fully latched position. In the fully latched position, the latch securing device 5d is fully engaged. One end of the latch securing device 5d blocks latching member 3a and thereby maintains latching member 3a in a latched position. Illustratively, latch securing device 5d may be blocked by the rotatable locking shaft 1d, thereby preventing a rotation of latch securing device 5d in the unlatching rotation direction 3i.

FIG. 5A shows the locking device 5 of FIG. 4A in an intermediate position. The rotatable locking shaft 1d rotates in the unlocking rotation direction 5c. As a result, recess 5e rotates in direction of the latching member 3a. However, latching member 3a is still is a closed position. In other words, latching member 3a is still in a locked and completely latched position.

FIG. 5B shows the latch securing monitoring device 6 of FIG. 4B still in the fully latched position. However, locking device 5 has moved to an intermediate position compared to FIG. 4B. In fact, locking shaft has, compared to FIG. 4B, rotated in the unlocking rotation direction 5c. As a result, recess 5f has rotated in the unlocking rotation direction 5c compared to FIG. 4B. Latch securing device 5d is still blocking latching member 3a and blocked by the rotatable locking shaft 1d.

Figure 6B:
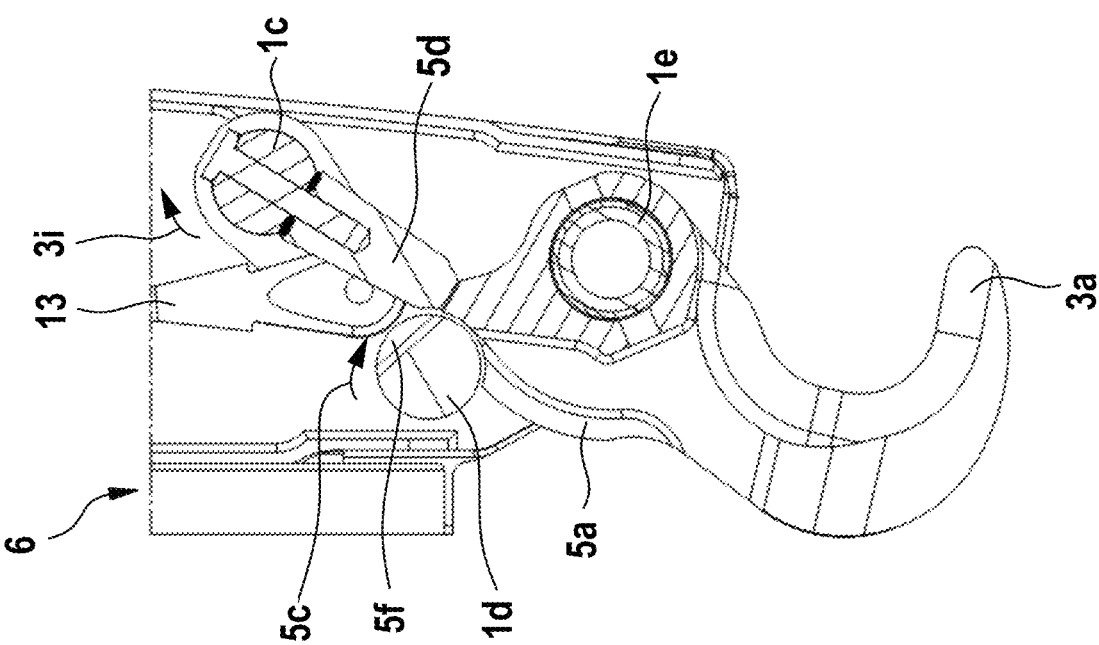
FIG. 6B shows the illustrative latch securing monitoring device of FIGS. 4B and 5B still in a fully latched position in accordance with some embodiments.
Figure 6A:
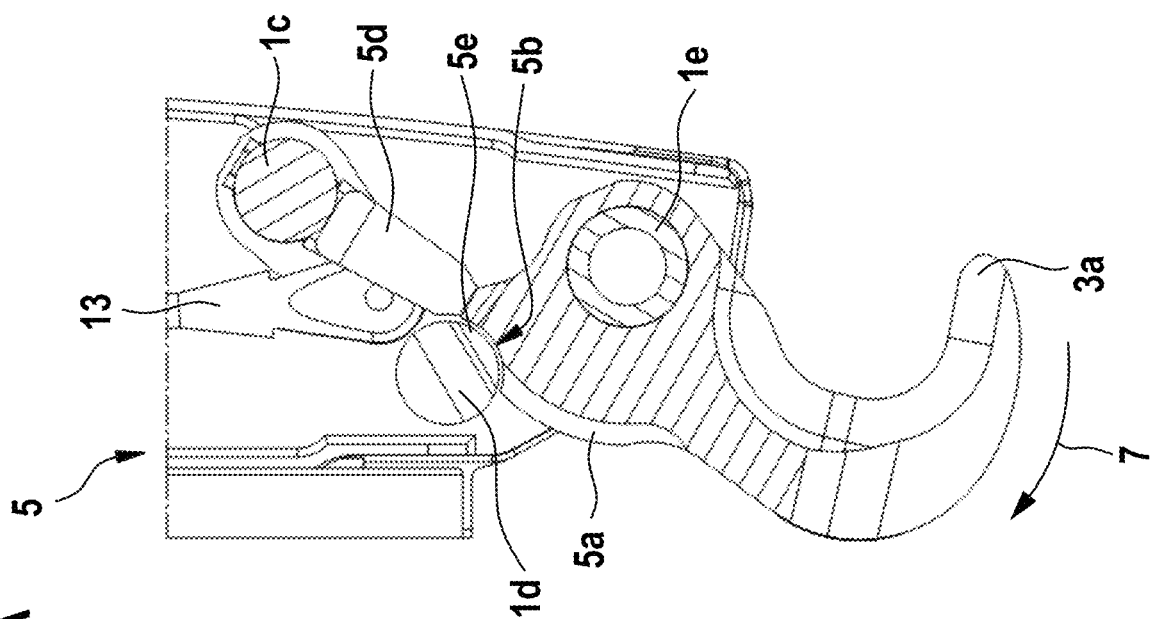
FIG. 6A shows the illustrative locking device of FIGS. 4A and 5A in an unlocked position in accordance with some embodiments.

FIG. 6A shows the locking device 5 of FIG. 4A in a fully unlocked position. Rotation of the rotatable locking shaft 1d is completed, and recess 5e has rotated close to circular shape 5b of latching member 3a. In the completely unlocked position, recess 5e may enable the rotation of the latching member 3a past the rotatable locking shaft 1d. However, the first latching member 3a is still latched and maintains the associated actuatable door (e.g., actuatable door 2 of FIG. 1) in the closed position.

FIG. 6B shows the latch securing monitoring device 6 of FIG. 4B at a latch monitoring limit position. In fact, locking device 5 is in a completely unlocked position. Rotation of the rotatable locking shaft 1d is completed, and recess 5f has rotated close to the latch securing device 5d. In the completely unlocked position, recess 5f may enable a movement of latch securing device 5d past the rotatable locking shaft 1d. At the latch monitoring limit position, the latch securing device 5d is still blocking latching member 3a, and thereby still prevents rotation of the latching member 3a.

Figure 7A:
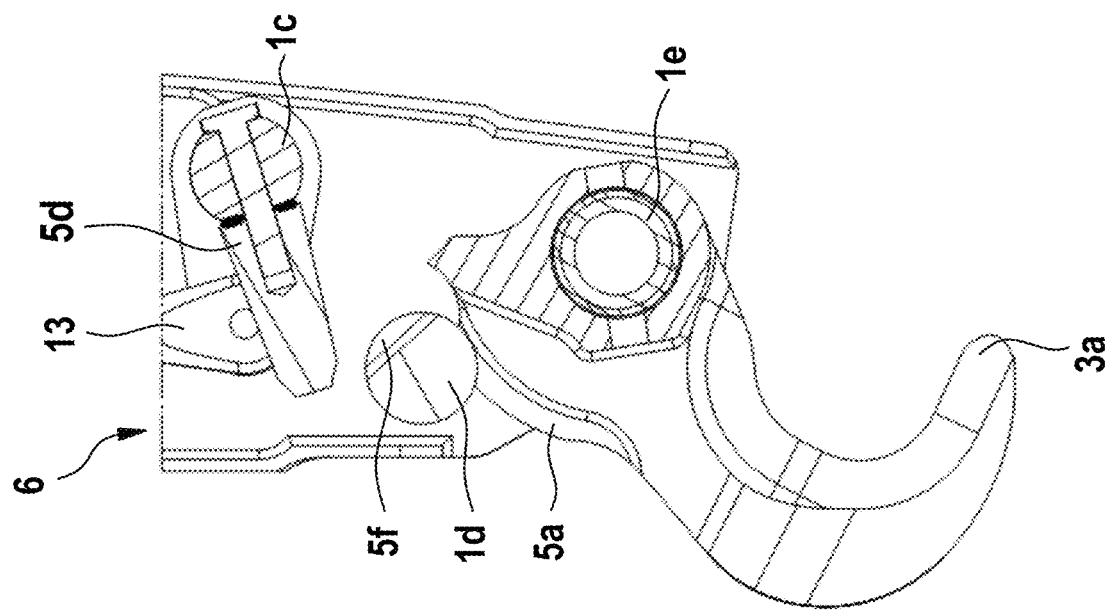
FIG. 7A shows the illustrative locking device of FIGS. 4A, 5A, and 6A in yet another unlocked position in accordance with some embodiments.

FIG. 7A shows the locking device 5 of FIG. 4A in the fully unlocked position of FIG. 6A. Compared to FIG. 6A, latching member 3a is rotating past the rotatable locking shaft 1d through recess 5e. More precisely, the locking cam 5a is engaged with recess 5e. In other words, locking cam 5a may block locking device 5 from returning to a locked position.

Figure 7B:
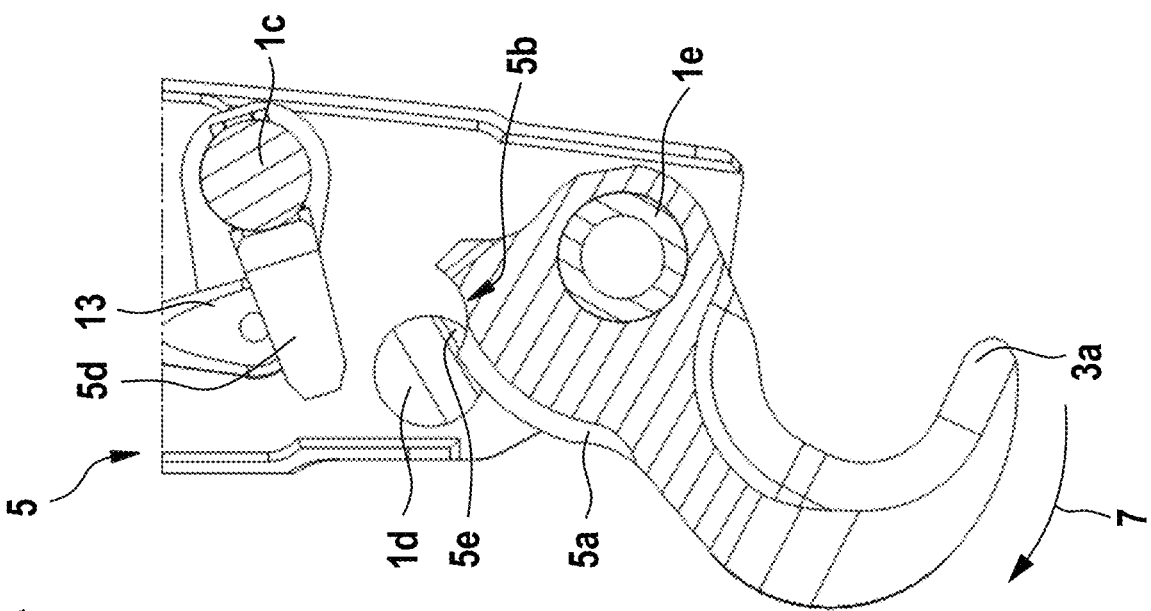
FIG. 7B shows the illustrative latch securing monitoring device of FIGS. 4B, 5B, and 6B in an intermediate position between fully latched and unlatched in accordance with some embodiments.

FIG. 7B shows the latch securing monitoring device 6 of FIG. 4B in an unlatched position. Compared to FIG. 6B, latch securing device 5d has rotated past the rotatable locking shaft 1d through recess 5f. In fact, latch shaft linkage 13 may have pulled latch securing device 5d into the unlatched position. Latching member 3a is in an intermediate position.

FIGS. 8A and 8B show the locking device 5 of FIG. 4A in a fully unlocked position and the latch securing monitoring device 6 of FIG. 4B in a fully unlatched position. The unlatching operation 7 is completed. Latching member 3a has rotated within recess 5e of the rotatable locking shaft 1d into a completely opened (i.e., unlatched) position. Latch securing device 5d has rotated past recess 5f of the rotatable locking shaft 1d.

Figure 9:
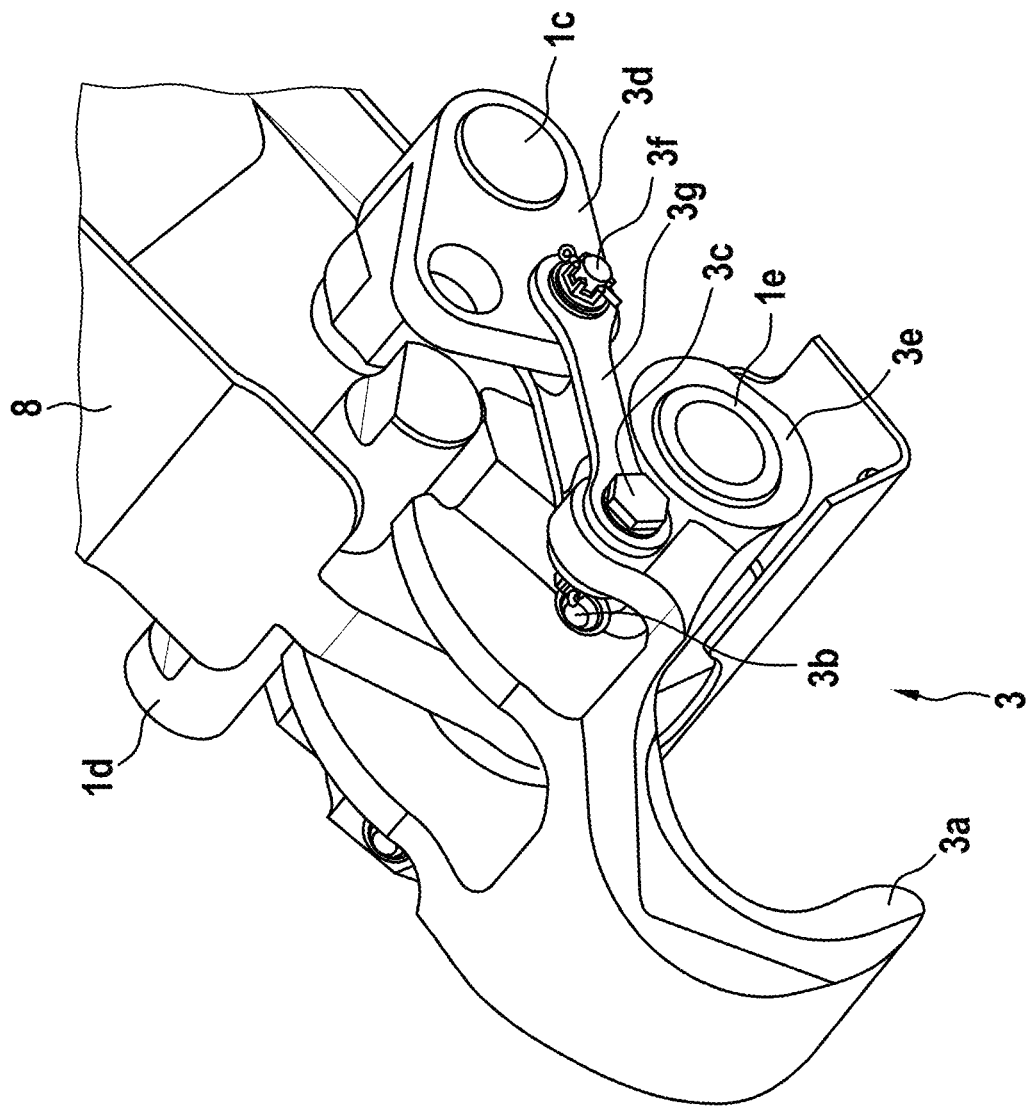
FIG. 9 shows a three-dimensional view of an illustrative latching and locking device in accordance with some embodiments.

FIG. 9 shows a three-dimensional view of portions of an illustrative actuating system (e.g., actuating system 1 of FIG. 1) according to some embodiments. The actuating system comprises a first rotatable latching shaft 1c, a second rotatable latching shaft 1e, a latching device 3, and a rotatable locking shaft 1d.

The latching device 3 may include a coupling link 3g, a first pivotable mechanical transmission element 3d, mounted onto the first rotatable latching shaft 1c, a second pivotable mechanical transmission element 3e, that is mounted onto the second rotatable latching shaft 1e, and that is connected to the first pivotable mechanical transmission element 3d via the coupling link 3g, and a latching member 3a.

Coupling link 3g may include at least one coupling rod 3g. Coupling link 3g may be pivotally mounted to the first pivotable mechanical transmission element 3d and to the second pivotable mechanical transmission element 3e.

Illustratively, coupling link 3g may be pivotally mounted to the first pivotable mechanical transmission element 3d by means of a connecting element 3f, e.g., a connecting bolt. Connecting element 3f may define a plain bearing between the first pivotable mechanical transmission element 3d and the coupling link 3g.

If desired, coupling link 3g may be pivotally mounted to second pivotable mechanical transmission element 3e by means of a connecting element 3c, e.g., a connecting bolt. Connecting element 3c may define a plain bearing between the coupling link 3g and the second pivotable mechanical transmission element 3e.

The first rotatable latching shaft 1c is rotated by an actuating mechanism similar to the one described in FIGS. 1 and 2. A first rotation of the first rotatable latching shaft 1c in operation upon actuation may result in pivoting of the first pivotable mechanical transmission element 3d, pivoting of the second mechanical transmission element 3e, and a second rotation of the second rotatable latching shaft 1e.

Latching member 3a may be mounted to a door structure 8, which may illustratively be an I-profile frame. If desired, latching member 3a may be non-rotatably mounted to the second rotatable latching shaft 1e. For example, latching member 3a may be non-rotatably mounted to the second rotatable latching shaft 1e via a pin 3b. Pin 3b may prevent a rotation of latching member 3a relative to the second rotatable latching shaft 1e. Latching member 3a may be adapted for latching an actuatable door (e.g., actuatable door 2 of FIG. 1) in a closed position.

It should be noted that modifications to the above described embodiments are within the common knowledge of the person skilled in the art and, thus, also considered as being part of the present invention.

For example, latching device 3 of FIG. 9 is shown with a single coupling link 3g that is pivotally mounted to the first pivotable mechanical transmission element 3d and to the second pivotable mechanical transmission element 3e. However, latching device 3 may have two coupling links 3g, one on each side of first pivotable mechanical transmission element 3d. Alternatively, first and second pivotable mechanical transmission elements 3d, 3e and coupling link 3g may be reproduced on the other side of I-profile frame 8.

Moreover, actuating system 1 of FIG. 1 illustratively comprises six latching devices 3, 4. However, if desired, actuating system 1 may have a single illustrative latching device 3 as described with reference to FIG. 3 that is associated with only one latching member 3a. All other latching members may be latched and locked by the single illustrative latching device 3.

Furthermore, latch securing device 5d of FIG. 2 may prevent a third rotation of latching member 3a, when latching member 3a latches the actuatable door in the closed position. However, latch securing device 5d of FIG. 2 may prevent the third rotation of first and second latching members 3a and 4a when the first and second latching members 3a, 4a latch the actuatable door in the closed position.

REFERENCE LIST 1 actuating system
1a actuating device
1b operating handle
1c first latching shaft
1d locking shaft
1e second latching shaft
1f rotatable shaft
1g intermediate shaft
2 actuatable door
3 first latching device
3a first latching member
3b pin
3c connecting element
3d first pivotable mechanical transmission element
3e second pivotable mechanical transmission element
3f connecting element
3g coupling link
3i unlatching rotation direction
3j cross link
4 second latching device
4a second latching member
5 locking device
5a locking cam
5b circular shape
5c unlocking rotation direction
5d first and second latch securing device
5e recess
5f recess
6 latch securing monitoring device
7 unlatching operation
8 door structure
9 vent door linkage
10 pressure spring
11 lateral latching bolt
12 locking shaft linkage
12a locking shaft linkage first part
12b locking shaft linkage second part
12c third pivotable mechanical transmission element
13 latching shaft linkage
13a latching shaft transmission element
14 vent door

What is claimed is:

1. An actuating system for an actuatable door, the actuating system comprising:
   a first rotatable latching shaft;
   a second rotatable latching shaft;
   a coupling link;
   a first pivotable mechanical transmission element, that is mounted onto the first rotatable latching shaft;
   a second pivotable mechanical transmission element, that is mounted onto the second rotatable latching shaft, and that is connected to the first pivotable mechanical transmission element via the coupling link, the coupling link being pivotally mounted to the first pivotable mechanical transmission element and to the second pivotable mechanical transmission element, such that rotation of the first rotatable latching shaft in operation upon actuation results in pivoting of the first pivotable mechanical transmission element, pivoting of the second mechanical transmission element, and rotation of the second rotatable latching shaft;
   a first latching member and a second latching member that are non-rotatably mounted to the second rotatable latching shaft and adapted for latching the actuatable door in a closed position, wherein the rotation of the second rotatable latching shaft causes rotation of the first and second latching members around an axis defined by the second rotatable latching shaft; and
   a first latch securing device and a second latch securing device that prevent the rotation of the first and second latching members when the first and second latching members latch the actuatable door in the closed position,
   wherein the first and second latch securing devices are fixedly mounted to the first rotatable latching shaft, and wherein the rotation of the first rotatable latching shaft causes rotation of the first and second latch securing devices around an additional axis defined by the first rotatable latching shaft,
   wherein the second pivotable mechanical transmission element comprises a first end and a second end, and wherein the first end of the second pivotable mechanical transmission element is mounted non-rotatively to the second rotatable latching shaft such that a rotation of the second end of the second pivotable mechanical transmission element around the axis defined by the second rotatable latching shaft causes a rotation of the second rotatable latching shaft.

2. The actuating system of claim 1, wherein the first pivotable mechanical transmission element and the second pivotable mechanical transmission element comprise at least one bell crank.

3. The actuating system of claim 1, wherein the coupling link comprises at least one coupling rod.

4. The actuating system of claim 1, further comprising:
   at least one pin that prevents a rotation of the first latching member relative to the second rotatable latching shaft.

5. The actuating system of claim 1, wherein the first pivotable mechanical transmission element comprises a first end and a second end, and wherein the first end of the first pivotable mechanical transmission element is mounted non-rotatively to the first rotatable latching shaft such that a rotation of the first rotatable latching shaft causes a rotation of the second end of the first pivotable mechanical transmission element around an additional axis defined by the first rotatable latching shaft.

6. The actuating system of claim 1, further comprising:
   a rotatable locking shaft that is adapted for blocking the first and second latching members when the first and second latching members latch the actuatable door in the closed position.

7. The actuating system of claim 6, wherein the rotatable locking shaft is further adapted for blocking the first and second latch securing devices when the first and second latching members latch the actuatable door in the closed position.

8. The actuating system of claim 6, further comprising:
   a third pivotable mechanical transmission element that is mounted to the rotatable locking shaft and wherein a rotational movement of the third pivotable mechanical transmission element causes a rotation of the rotatable locking shaft.

9. The actuating system of claim 6, wherein the rotatable locking shaft further comprises:
   at least one recess that is adapted for unblocking the first latch securing device and enables a movement of the first latch securing device past the rotatable locking shaft.

10. The actuating system of claim 6, wherein the rotatable locking shaft further comprises:
    at least one additional recess that is adapted for unblocking the first latching member and enables the rotation of the first latching member past the rotatable locking shaft during an unlatching operation.

11. The actuating system of claim 6, wherein the first latching member further comprises:
   a locking cam that blocks the rotatable locking shaft when the first latching member is unlatched.

12. An actuatable door in particular for an aircraft, comprising an actuating system according to claim 1.

13. An actuating system for an actuatable door, the actuating system comprising:
   a first rotatable latching shaft;
   a second rotatable latching shaft;
   a coupling link;
   a first pivotable mechanical transmission element, that is mounted onto the first rotatable latching shaft;
   a second pivotable mechanical transmission element, that is mounted onto the second rotatable latching shaft, and that is connected to the first pivotable mechanical transmission element via the coupling link, the coupling link being pivotally mounted to the first pivotable mechanical transmission element and to the second pivotable mechanical transmission element, such that rotation of the first rotatable latching shaft in operation upon actuation results in pivoting of the first pivotable mechanical transmission element, pivoting of the second mechanical transmission element, and rotation of the second rotatable latching shaft;
   first and second latching members that are non-rotatably mounted to the second rotatable latching shaft and adapted for latching the actuatable door in a closed position, wherein the rotation of the second rotatable latching shaft causes rotation of the first and second latching members around an axis defined by the second rotatable latching shaft;
   a first latch securing device and a second latch securing device that prevent the rotation of the first and second latching members when the first and second latching members latch the actuatable door in the closed position,
   wherein the first and second latch securing devices are fixedly mounted to the first rotatable latching shaft, and wherein the rotation of the first rotatable latching shaft causes a rotation of the first and second latch securing devices around an additional axis defined by the first rotatable latching shaft;
   a rotatable locking shaft that is adapted for blocking the first and second latching members when the first and second latching members latch the actuatable door in the closed position; and
   wherein the rotatable locking shaft further comprises at least one recess that is adapted for unblocking the first latch securing device and enables a movement of the first latch securing device past the rotatable locking shaft.

14. The actuating system of claim 13, wherein the first pivotable mechanical transmission element and the second pivotable mechanical transmission element comprise at least one bell crank.

15. The actuating system of claim 13, wherein the coupling link comprises at least one coupling rod.

16. The actuating system of claim 13, further comprising:
   at least one pin that prevents a rotation of the first latching member relative to the second rotatable latching shaft.

* * * * *